US008957935B2

(12) United States Patent
Park

(10) Patent No.: US 8,957,935 B2
(45) Date of Patent: Feb. 17, 2015

(54) LIGHT SCANNING UNIT AND ELECTRO-PHOTOGRAPHIC IMAGE FORMING APPARATUS EMPLOYING THE SAME

(71) Applicant: Samsung Electronics Co., Ltd., Suwon-si (KR)

(72) Inventor: Gi-sung Park, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/075,384

(22) Filed: Nov. 8, 2013

(65) Prior Publication Data

US 2014/0132695 A1 May 15, 2014

(30) Foreign Application Priority Data

Nov. 12, 2012 (KR) ........................ 10-2012-0127733

(51) Int. Cl.
*B41J 15/14* (2006.01)
*B41J 27/00* (2006.01)
*G03G 15/04* (2006.01)
*G02B 26/10* (2006.01)
*G02B 26/12* (2006.01)

(52) U.S. Cl.
CPC ........ *G03G 15/04036* (2013.01); *G02B 26/101* (2013.01); *G02B 26/125* (2013.01)
USPC .......................................... 347/243; 347/259

(58) Field of Classification Search
USPC .......... 347/230, 231, 233, 241–244, 256–259
See application file for complete search history.

(56) References Cited

U.S. PATENT DOCUMENTS 6,590,688 B2 * 7/2003 Ishihara ...................... 359/207.5
8,217,980 B2 * 7/2012 Tanimura ..................... 347/244

FOREIGN PATENT DOCUMENTS

JP    2001-180040    7/2001

* cited by examiner

*Primary Examiner* — Hai C Pham
(74) *Attorney, Agent, or Firm* — Staas & Halsey LLP

(57) ABSTRACT

A light scanning unit and an electro-photographic image forming apparatus employing the same are provided. A light scanning unit for scanning a beam onto a scanned surface includes a light source for emitting a beam according to an image signal; an optical deflector for deflecting and scanning the beam emitted from the light source, in a main scanning direction; and a imaging optical system for imaging the beam deflected and scanned by the optical deflector, on the scanned surface, wherein, if a main scanning direction width of the beam emitted from the light source is defined as a, a sub-scanning direction width of the beam is defined as b, a main scanning incident angle of the beam incident on the scanned surface with respect to a main scanning section is defined as $\Phi$, and a sub-scanning incident angle of the beam incident on the scanned surface with respect to a sub-scanning section is defined as $\beta$, a maximum main scanning incident angle $\Phi_{max}$ and a sub-scanning incident angle $\beta$ of the beam satisfy $\Phi_{max} \cdot \beta < 0.1 \times b/2a$.

16 Claims, 9 Drawing Sheets

BS$_L$

BS$_R$

BS$_L$

BS$_R$

LIGHT SCANNING UNIT AND ELECTRO-PHOTOGRAPHIC IMAGE FORMING APPARATUS EMPLOYING THE SAME

CROSS-REFERENCE TO RELATED APPLICATIONS

This application claims the priority benefit of Korean Patent Application No. 10-2012-0127733, filed on Nov. 12, 2012, in the Korean Intellectual Property Office, the disclosure of which is incorporated herein in its entirety by reference.

BACKGROUND

1. Field

Embodiments relate to a light scanning unit (light scanner) and an electro-photographic image forming apparatus employing the same, and more particularly, to a light scanning unit (light scanner) capable of reducing directivity of profiles of dots of an exposed beam, and an electro-photographic image forming apparatus employing the same.

2. Description of the Related Art

Electro-photographic image forming apparatuses such as a laser printer, a digital copier, and a multi-function printer have a configuration in which a laser scanning unit scans light onto a photoconductor that is uniformly electrified by an electrifier so as to achieve selective exposure and thus to form an electrostatic latent image, the formed electrostatic latent image is developed as an image by using a developing agent such as a toner, and the developed image is transferred to a print medium.

In an image forming apparatus, in order to obtain a color image, a plurality of developers accommodating a plurality of different color developing agents (toners) are disposed around a photoconductor such as a photosensitive drum, a developer accommodating a predetermined color toner is disposed to face the photoconductor so as to develop an electrostatic latent image, an image of the toner is transferred to a recording medium, and the above developing and transferring operations are performed for the other colors.

In a conventional image forming apparatus, in consideration of an inner size of the conventional image forming apparatus, positions of components such as developers disposed around a photoconductor, and prevention of a ghost effect due to secondary reflective light of a beam reflected on a surface of the photoconductor, a sufficient incident angle is set to a beam incident onto the photoconductor.

Also, in a color image forming apparatus, when a color image is formed by overlapping single-color images on a recording medium, since locations where the images are recorded are inevitably slightly offset from each other, a stain or a moire pattern is generated due to inappropriately mixed colors. In order to prevent this problem, a conventional color image forming apparatus sets different screen angles to different color images. As such, even when locations of the color images are offset, colors may be constantly maintained and a moire pattern may be prevented. A combination of screen angles that are broadly and generally used in print apparatuses is a combination of yellow 0°, cyan or magenta 75°, black 45°, and magenta or cyan 105°.

Currently, in order to reduce a total size of a color image forming apparatus, a distance from a laser scanning unit to a photosensitive drum is decreased. As such, a main scanning direction incident angle of a beam on the photosensitive drum is increased and thus a profile of an exposed beam is distorted.

Also, in order to achieve a high-quality color image, a high resolution mode (a large number of lines per inch (LPI)) is applied. In order to achieve a large LPI, since a distance between dots on a surface of a photosensitive drum is reduced and interference occurs between a profile of an exposed beam and a screen angle, the uniformity in color densities on paper may be reduced, colors may be offset, and thus image quality may be reduced.

SUMMARY

In an aspect of one or more embodiments, there is provided a light scanning unit (light scanner) capable of achieving uniform color densities by reducing directivity of profiles of dots of an exposed beam on a surface of a photoconductor and reducing interference between adjacent dots with respect to screen angles of colors, so as to form a small and high-quality image, and an electro-photographic image forming apparatus employing the same.

In an aspect of one or more embodiments, there is provided a light scanning unit for scanning a beam onto a scanned surface, the light scanning unit including a light source which emits a beam according to an image signal; an optical deflector which deflects and scans the beam emitted from the light source, in a main scanning direction; and a imaging optical system which images the beam deflected and scanned by the optical deflector, on the scanned surface, wherein, if a main scanning direction width of the beam emitted from the light source is defined as a, a sub-scanning direction width of the beam is defined as b, a main scanning incident angle of the beam incident on the scanned surface with respect to a main scanning section is defined as $\Phi$, and a sub-scanning incident angle of the beam incident on the scanned surface with respect to a sub-scanning section is defined as $\beta$, a maximum main scanning incident angle $\Phi_{max}$ and a sub-scanning incident angle $\beta$ of the beam satisfy $\Phi_{max}\beta<0.1\times b/2a$.

The maximum main scanning incident angle $\Phi_{max}$ and the sub-scanning incident angle $\beta$ of the beam satisfy $\Phi_{max}\cdot\beta<180$. For example, the maximum main scanning incident angle $\Phi_{max}$ may be greater than 30° and the sub-scanning incident angle $\beta$ may be equal to or less than 5°.

If an fθ coefficient of the imaging optical system is defined as k, and a valid scanning width of the beam scanned onto the scanned surface is defined as W, the fθ coefficient k and the valid scanning width W may satisfy k/W<0.6.

If a valid scanning width of the beam scanned onto the scanned surface is defined as W, and a scanning distance from the optical deflector to the scanned surface is defined as D, the valid scanning width W and the scanning distance D may satisfy D/W<0.6. For example, the scanning distance D from the optical deflector to the scanned surface may be equal to or less than 140 mm.

The imaging optical system may include at least one scanning lens having fθ characteristics.

In an aspect of one or more embodiments, there is provided an electro-photographic image forming apparatus including an image carrier; a light scanning unit (light scanner) which forms an electrostatic latent image by scanning light onto a scanned surface of the image carrier; and a developer which supplies a toner and develops the electrostatic latent image formed on the image carrier, wherein the light scanning unit (light scanner) includes a light source which emits a beam according to an image signal; an optical deflector which deflects and scans the beam emitted from the light source, in a main scanning direction; and a imaging optical system which images the beam deflected and scanned by the optical deflector, on the scanned surface, and wherein, if a main scanning direction width of the beam emitted from the light source is defined as a, a sub-scanning direction width of the beam is defined as b, a main scanning incident angle of the beam incident on the scanned surface with respect to a main scanning section is defined as $\Phi$, and a sub-scanning incident angle of the beam incident on the scanned surface with respect to a sub-scanning section is defined as $\beta$, a maximum main scanning incident angle $\Phi_{max}$ and a sub-scanning incident angle $\beta$ of the beam satisfy $\Phi_{max} \cdot < 0.1 \times b/2a$.

The image carrier may be a photosensitive drum.

A plurality of developers may be disposed around one image carrier.

As described above, according to an aspect of one or more embodiments, by appropriately selecting a maximum main scanning incident angle of a light scanning unit and a sub-scanning incident angle of a photoconductor, color reproducibility of a color image may be improved. Also, since a high-resolution mode (a large LPI) may be applied without causing a difference in color densities, generation of a moire pattern may be suppressed.

BRIEF DESCRIPTION OF THE DRAWINGS

The above and other aspects of embodiments will become more apparent by describing in detail exemplary embodiments thereof with reference to the attached drawings in which.

DETAILED DESCRIPTION

Figure 1:
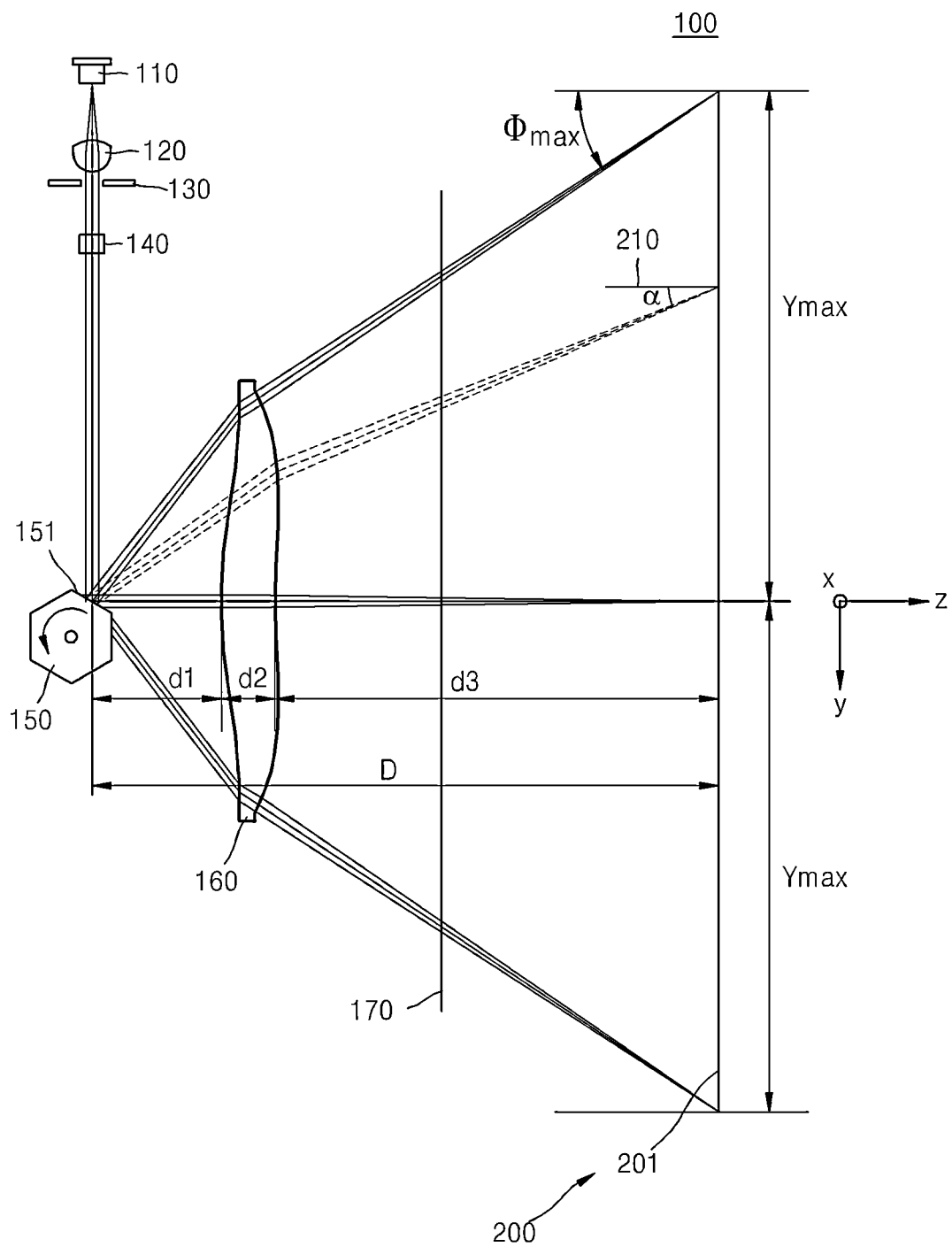
FIG. 1 is a schematic diagram showing an optical configuration of a light scanning unit with respect to a main scanning section, according to an embodiment.

Reference will now be made in detail to embodiments, examples of which are illustrated in the accompanying drawings, wherein like reference numerals refer to the like elements throughout. Embodiments are described below by referring to the figures.

Figure 2:
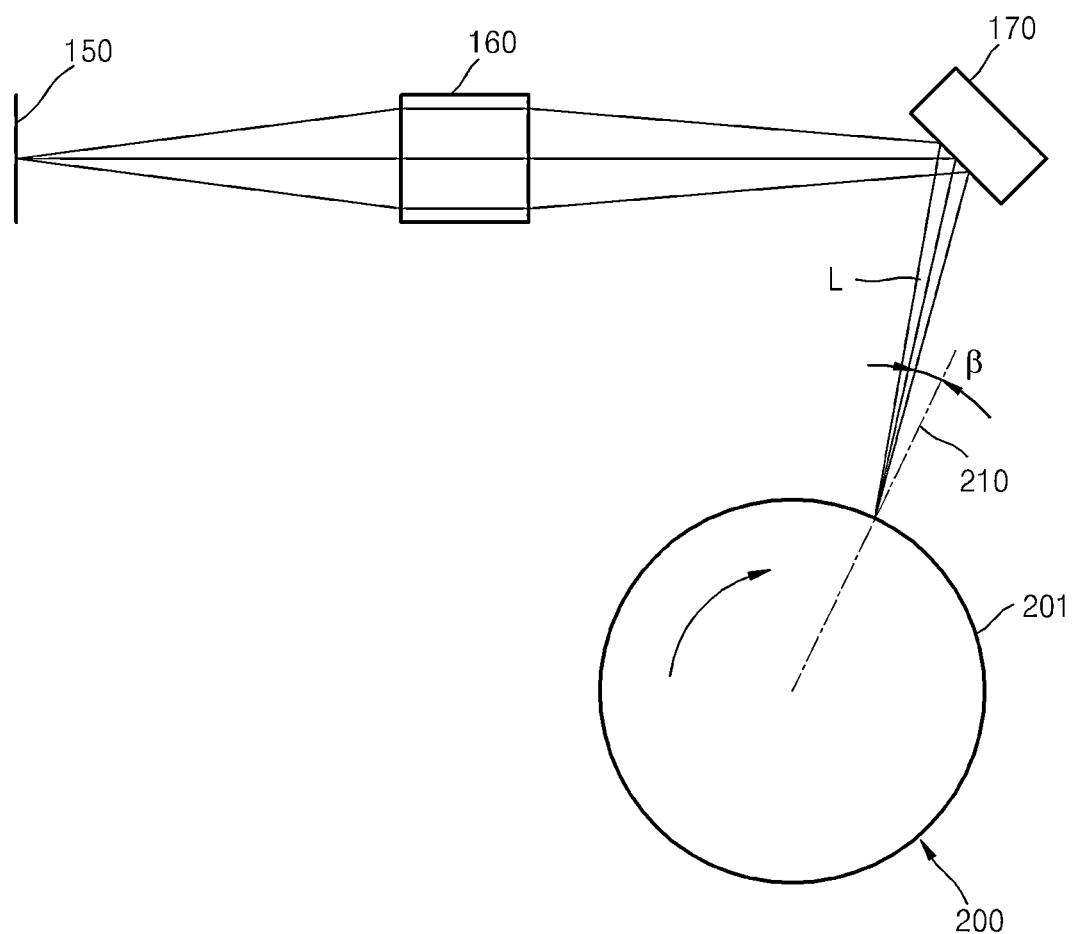
FIG. 2 is a schematic diagram showing an optical configuration of the light scanning unit illustrated in FIG. 1 with respect to a sub-scanning section.

FIG. 1 is a schematic diagram showing an optical configuration of a light scanning unit 100 with respect to a main scanning section, according to an embodiment. FIG. 2 is a schematic diagram showing an optical configuration of the light scanning unit 100 illustrated in FIG. 1 with respect to a sub-scanning section. For clarity of illustration, in FIG. 1, a change in optical path of a beam L due to a reflective mirror 170 is ignored.

A main scanning section may refer to a plane on which the beam L is swept when the beam L is deflected and scanned due to rotation of an optical deflector 150. The main scanning section is parallel to both a main scanning direction and a proceeding direction of the beam L. Also, the main scanning section may be regarded as a plane orthogonal to a rotation axis direction of the optical deflector 150. In this case, the main scanning direction is defined with reference to FIG. 1 as a direction in which the beam L is deflected and scanned due to rotation of the optical deflector 150. With respect to a scanned surface 201, a direction in which the beam L is deflected and scanned by the optical deflector 150, e.g., a y direction, may be referred to as the main scanning direction.

The sub-scanning section is a plane orthogonal to the main scanning direction. The sub-scanning section is parallel to both a sub-scanning direction and the proceeding direction of the beam L. In this case, the sub-scanning direction is a normal direction of the main scanning section. With respect to the scanned surface 201, a direction in which the scanned surface 201 moves, e.g., an x direction, may be referred to as the sub-scanning direction. As illustrated in FIG. 2, the scanned surface 201 moves due to rotation of a photosensitive drum 200.

Referring to FIG. 1, the light scanning unit 100 according to an embodiment includes a light source 110 for emitting the beam L modulated according to an image signal. A laser diode may be employed as the light source 110. The beam L emitted from the light source 110 is deflected and scanned by the optical deflector 150. The optical deflector 150 may be a rotating polygon mirror having a plurality of reflective surfaces 151 and rotating due to a driver (not shown), e.g., a motor. The optical deflector 150 may also be a microelectromechanical system (MEMS) mirror.

An incident optical system may be prepared on an optical path between the light source 110 and the optical deflector 150. The incident optical system may include at least one of a collimating lens 120, an aperture stop 130, and a cylindrical lens 140, which are prepared on the optical path of the beam L. The collimating lens 120 is a focusing lens for converting the beam L emitted from the light source 110, into a collimated or convergent beam. The aperture stop 130 determines a cross-section (e.g., a diameter and shape) of the beam L. The cylindrical lens 140 is an anamorphic lens for almost linearly focusing the beam L on the reflective surfaces 151 of the optical deflector 150 by focusing the beam L in the sub-scanning direction. The collimating lens 120 and the cylindrical lens 140 may be integrally formed as a single lens for focusing the beam L in the sub-scanning direction and converting the beam L into a collimated or convergent beam in the main scanning direction. Although the aperture stop 130 is disposed between the collimating lens 120 and the cylindrical lens 140 in FIG. 1, the aperture stop 130 may be disposed at another location in the incident optical system (for example, between the light source 110 and the collimating lens 120 or between the cylindrical lens 140 and the optical deflector 150).

Referring to FIGS. 1 and 2, an imaging optical system is prepared on an optical path between the optical deflector 150 and the scanned surface 201. The imaging optical system images the beam L deflected and scanned by the optical deflector 150 on the scanned surface 201. The imaging optical system may include one scanning lens 160 prepared on the optical path of the beam L. The reflective mirror 170 capable of appropriately changing an optical path may be further disposed in the imaging optical system or between the imaging optical system and the scanned surface 201.

The beam L emitted from the light scanning unit 100, according to an embodiment, is incident on a surface of the photosensitive drum 200, i.e., the scanned surface 201, at a main scanning incident angle α and a sub-scanning incident angle β. In this case, the main scanning incident angle α refers to an incident angle of the beam L on the scanned surface 201 with respect to the main scanning section. The sub-scanning incident angle β refers to an incident angle of the beam L on the scanned surface 201 with respect to the sub-scanning section. In FIG. 2, reference numeral 210 represents a normal with respect to the scanned surface 201.

As illustrated in FIG. 1, due to rotation of the optical deflector 150, the main scanning incident angle α of the beam L cyclically varies in a range from $-\Phi_{max}$ to $+\Phi_{max}$. In this case, a maximum valid scanning height from an image center C on the scanned surface 201 is referred to as a maximum scanning image height, and a maximum main scanning incident angle of a beam incident to the maximum scanning image height of the scanned surface 201 is referred to as a maximum main scanning incident angle. The maximum scanning image height is referred to as $Y_{max}$ and the maximum main scanning incident angle is referred to as $\Phi_{max}$. A valid scanning width W refers to a width of the beam L that is validly scanned in the main scanning direction, and is two times greater than $Y_{max}$.

The maximum main scanning incident angle $\Phi_{max}$ is determined according to an optical design of the imaging optical system, and the sub-scanning incident angle β of the beam L incident on the scanned surface 201 may be changed by adjusting an installation direction of the light scanning unit 100 or a reflection angle of the reflective mirror 170.

In the light scanning unit 100 according to an embodiment, in order to prevent an increase in an asymmetry ratio of the beam L exposed on the scanned surface 201, the maximum main scanning incident angle $\Phi_{max}$ and the sub-scanning incident angle β satisfy the condition of $\Phi_{max} \cdot \beta < 0.1 \times b/2a$ as described below with reference to Expression 5.

Furthermore, as described below in relation to a design example of the light scanning unit 100, the maximum main scanning incident angle $\Phi_{max}$ and the sub-scanning incident angle β may be designed to satisfy $\Phi_{max} \cdot \beta < 180$. For example, the maximum main scanning incident angle $\Phi_{max}$ may be greater than 30° and the sub-scanning incident angle β may be equal to or less than 5°.

Also, as described below in relation to the design example of the light scanning unit 100, if an fθ coefficient of the imaging optical system is k and the valid scanning width is W, the condition of k/W<0.6 may be satisfied and thus the light scanning unit 100 may be configured to have a large viewing angle. Here, if a scanning angle is θ [rad] and an image height on a scanned surface is Y [mm], the fθ coefficient k [mm/rad] of the imaging optical system is a coefficient that satisfies the correlation of Y=kθ. The valid scanning width W refers to a maximum image width that is scannable on the scanned surface 201 and satisfies the correlation of W=2×$Y_{max}$.

Also, as described below in relation to the design example of the light scanning unit 100, if the valid scanning width is W and a distance from the reflective surface 151 to the scanned surface 201 is L, the condition of L/W<0.8 may be satisfied and thus an image forming apparatus employing the light scanning unit 100 may have a small size.

A predetermined condition satisfied by the maximum main scanning incident angle $\Phi_{max}$ and the sub-scanning incident angle β will now be described with reference to FIGS. 3 through 6.

Figure 3:
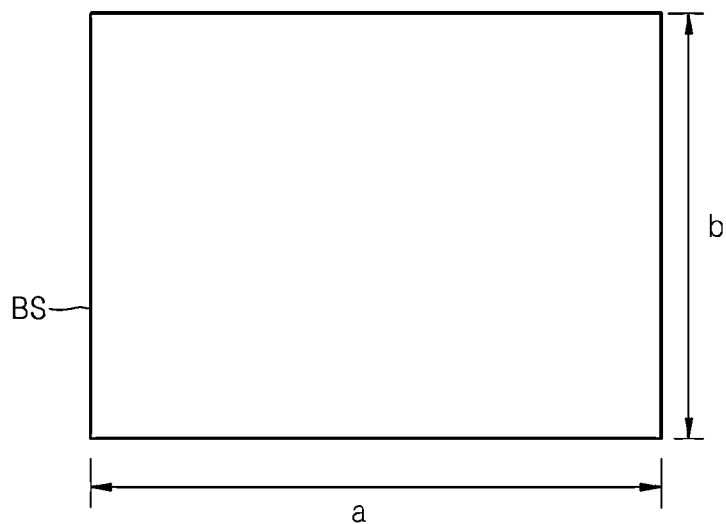
FIG. 3 is a diagram showing a main scanning direction width and a sub-scanning direction width of a beam incident on a scanned surface, in main and sub-scanning directions.
Figure 4:
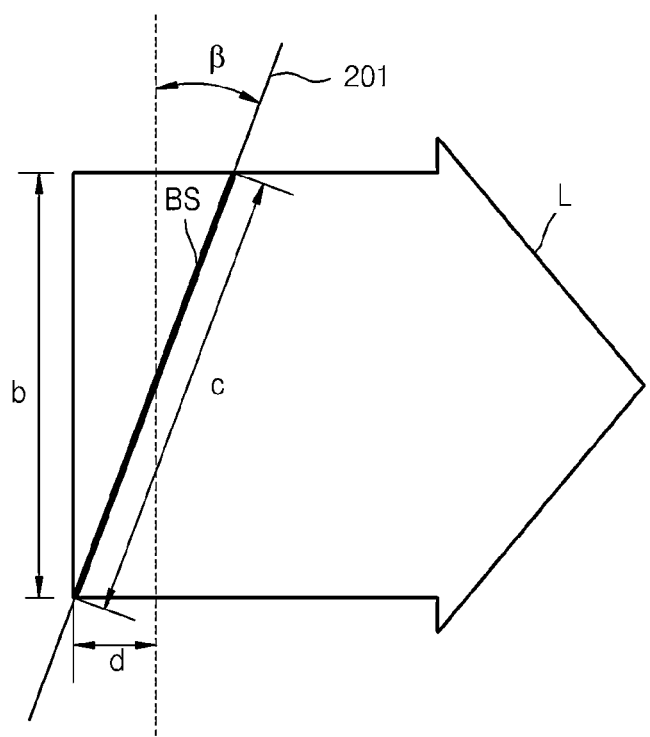
FIG. 4 is a diagram showing the beam incident on the scanned surface with respect to the sub-scanning section.
Figure 5:
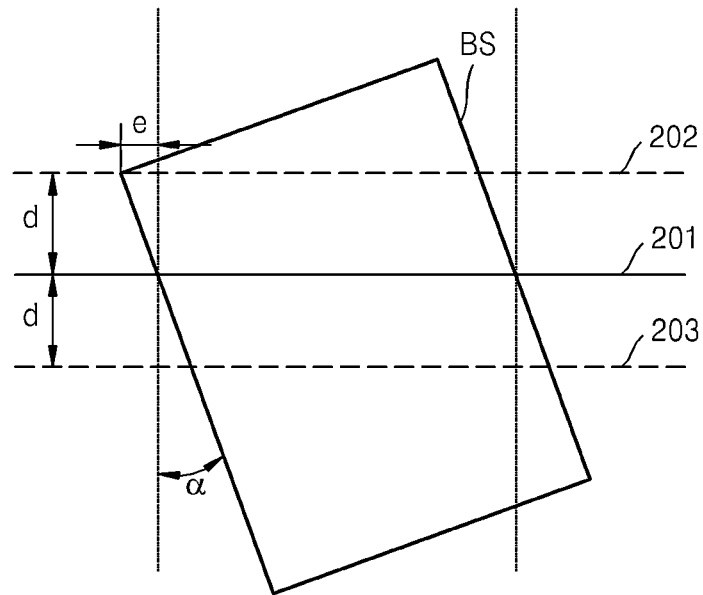
FIG. 5 is a diagram showing the beam incident on the scanned surface with respect to the main scanning section.
Figure 6:
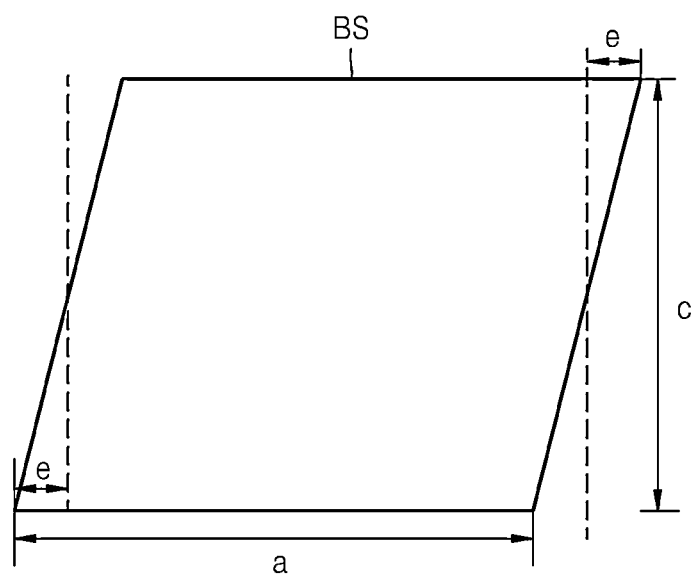
FIG. 6 is a diagram showing the main and sub-scanning direction widths of the beam imaged on the scanned surface.

FIG. 3 is a diagram showing a main scanning direction width and a sub-scanning direction width of the beam L incident on the scanned surface 201. FIG. 4 is a diagram showing the beam L incident on the scanned surface 201 with respect to the sub-scanning section. FIG. 5 is a diagram showing the beam L incident on the scanned surface 201 with respect to the main scanning section. FIG. 6 is a diagram showing the main and sub-scanning direction widths of a beam spot BS of the beam L imaged on the scanned surface 201.

In order to efficiently represent the effect of oblique incidence, it is assumed for convenience's sake that the beam L incident on the photosensitive drum 200 has a rectangular cross-section as illustrated in FIG. 3, and the main scanning direction width is referred to as a and the sub-scanning direction width is referred to as b.

As illustrated in FIGS. 1 and 2, when the beam L is obliquely incident on the scanned surface 201 of the photosensitive drum 200, the beam spot BS of the beam L imaged on the scanned surface 201 has widths that vary according to the main scanning incident angle α and the sub-scanning incident angle β.

Referring to FIGS. 2 and 4, with respect to the sub-scanning section, since the beam L is incident on the scanned surface 201 of the photosensitive drum 200 at the sub-scanning incident angle β, the beam spot BS of the beam L on the scanned surface 201 has a sub-scanning direction width c that extends along the scanned surface 201. In FIG. 4, a solid line represents a cross-section of the scanned surface 201 exposed at the sub-scanning incident angle β and is viewed as a line with respect to the sub-scanning section. A dashed line represents a focal plane of the incident beam L with respect to the sub-scanning section. The sub-scanning direction width c of the beam spot BS exposed on the scanned surface 201 is b/cos(β). Upper and lower portions of the beam spot BS imaged on the scanned surface 201 respectively have depths d and −d with respect to the focal plane. As clearly shown in FIG. 4, the depth d is (b/2)tan β.

Also, referring to FIGS. 1 and 5, with respect to the main scanning section, the beam L is incident on the scanned surface 201 of the photosensitive drum 200 at the main scanning incident angle α. That is, the beam spot BS of the beam L is exposed on the scanned surface 201 at an angle and its upper and lower vertices are shifted by a distance e along opposite directions of the main scanning direction. In FIG. 5, reference numeral 202 represents a cross-section of an exposed surface which passes through an upper end of the beam spot BS, and reference numeral 203 represents a cross-section of an exposed surface which passes through a lower end of the beam spot BS. In this case, as clearly shown in FIG. 5, the distance e by which the vertices of the beam spot BS are shifted along the main scanning direction may be represented by Expression 1.

$$e = \left(\frac{b}{2}\right)\tan\alpha\tan\beta \qquad \text{[Expression 1]}$$

The beam spot BS ultimately imaged on the scanned surface 201 of the photosensitive drum 200 has a tilted shape as illustrated in FIG. 6. In FIG. 6, a dashed line refers to a case when the main scanning incident angle α is zero degree (0°).

Since the sub-scanning incident angle β is maintained constant while the beam L is being scanned, the sub-scanning direction width c of the beam spot BS is maintained constant. The distance e by which the vertices of the beam spot BS are shifted along the main scanning direction cyclically varies in a range from $-(b/2)\tan \Phi_{max} \tan \beta$ to $+(b/2)\tan \Phi_{max} \tan \beta$ according to the main scanning incident angle α of the beam L which cyclically varies in a range from $-\Phi_{max}$ to $+\Phi_{max}$. In this case, since left and right sides of an image have opposite signs of the main scanning incident angle β, left and right sides of the beam spot BS are tilted in opposite directions.

If diagonal lengths of the exposed beam spot BS are referred to as $D_1$ and $D_2$, $D_1$ and $D_2$ may be represented by Expression 2.

$$D_1 = \sqrt{(a + b\tan\alpha\tan\beta)^2 + \left(\frac{b}{\cos\beta}\right)^2} \quad \text{[Expression 2]}$$

$$D_2 = \sqrt{(a - b\tan\alpha\tan\beta)^2 + \left(\frac{b}{\cos\beta}\right)^2}$$

An asymmetry ratio (distortion level) of the beam spot BS, i.e., $D_1/D_2$, may be represented by Expression 3.

$$\frac{D_1}{D_2} = \sqrt{\frac{1 + \left(\frac{a}{b} + \tan\alpha\tan\beta\right)^2}{1 + \left(\frac{a}{b} - \tan\alpha\tan\beta\right)^2}} \quad \text{[Expression 3]}$$

The asymmetry ratio $D_1/D_2$ of the beam spot BS varies according to the main scanning incident angle α of the beam L which cyclically varies in a range from $-\Phi_{max}$ to $+\Phi_{max}$. When an optical system is designed, on the assumption that the maximum main scanning incident angle $\Phi_{max}$ and the sub-scanning incident angle β are sufficiently small, a maximum allowable asymmetry ratio $(D_1/D_2)_{max}$ of the beam spot BS may be approximated by using Expression 4.

$$\left(\frac{D_1}{D_2}\right)_{max} \approx 1 + \frac{2a}{b}\Phi_{max} \cdot \beta \quad \text{[Expression 4]}$$

In consideration of general cognitive abilities of people, if the asymmetry ratio $D_1/D_2$ of the beam spot BS is greater than 10%, a serious reduction in image quality is recognized. Therefore, the light scanning unit 100 according to an embodiment is designed in such a way that the asymmetry ratio $D_1/D_2$ of the beam spot BS is less than 10%. That is, the light scanning unit 100 according to an embodiment is designed in such a way that the maximum main scanning incident angle $\Phi_{max}$ and the sub-scanning incident angle β satisfy Expression 5.

$$\Phi_{max} \cdot \beta < 0.1 \frac{b}{2a} \quad \text{[Expression 5]}$$

In Expressions 4 and 5, the unit of angles is radians.

If the main scanning direction width a and the sub-scanning direction width b of the beam L are the same or similar, the maximum main scanning incident angle $\Phi_{max}$ and the sub-scanning incident angle β may be converted as represented by Expression 6. In Expression 6, the unit of angles is converted to degrees.

$$\Phi_{max} \cdot \beta < 180 \quad \text{[Expression 6]}$$

That is, if the light scanning unit 100 according to an embodiment is designed to satisfy Expression 6, the asymmetry ratio $D_1/D_2$ of the beam spot BS may be suppressed to be less than 10% and a reduction in image quality due to asymmetry of the beam spot BS under general cognitive abilities of people may be prevented Interference due to different screen angles and the asymmetry ratio $D_1/D_2$ of the beam spot BS will now be described with reference to specific design data of the light scanning unit 100 according to an embodiment.

Table 1 shows a basic layout of an entire optical system of the light scanning unit 100 according to an embodiment.

TABLE 1

| Configuration of Light Scanning Unit | | |
|---|---|---|
| Valid Maximum Viewing Angle [deg] | $\theta_{max}$ | 52.5 |
| Valid Scanning Width [mm] | W | 216 |
| fθ Coefficient [mm/rad] | k | 117.866 |
| Maximum Scanning Image Height [mm] | $Y_{max}$ | 108 |
| Maximum Main Scanning Incident Angle [deg] | $\Phi_{max}$ | 34.1 |
| Wavelength, Refractive index | | |
| Used Wavelength [nm] | λ | 786.5 |
| Refractive Index of Scanning Lens | n | 1.537 |
| Position of Imaging Optical System [mm] | | |
| Deflection Surface of Optical Deflector~ Incident Surface of Scanning Lens | $d_1$ | 26.4 |
| Incident Surface of Scanning Lens~ Exiting Surface of Scanning Lens | $d_2$ | 12 |
| Exiting Surface of Scanning Lens~ Scanned Surface | $d_3$ | 95.6 |

In Table 1, the valid scanning width W is two times greater than the maximum scanning image height $Y_{max}$, and the distances $d_1$, $d_2$, and $d_3$ of the scanning lens 160 are as shown in FIG. 1.

An aspherical shape of the incident/exiting surface of the scanning lens 160 of the imaging optical system may be represented by Expression 7.

$$z = \frac{C_1|y|^2}{1 + \sqrt{1 - (1+K)C_1^2|y|^2}} + \sum_n A_n|y|^n + \frac{C_2\left(1 + \sum_n B_n|y|^n\right)x^2}{1 + \sqrt{1 - C_2^2\left(1 + \sum_n B_n|y|^n\right)x^2}} \quad \text{[Equation 7]}$$

Here, a z axis represents an optical axis direction, an x axis represents a sub-scanning direction, a y axis represents a main scanning direction, K represents a conic constant, $A_n$ represents a main scanning direction aspherical coefficient, and $B_n$ represents a sub-scanning direction aspherical coefficient. Also, $C_1$ represents a reciprocal of a main scanning direction curvature radius R, and $C_2$ represents a reciprocal of a sub-scanning direction curvature radius r.

Table 2 shows exemplary values of aspherical coefficients of Expression 7.

TABLE 2

|  |  | Main Scanning | | | Sub-scanning | |
|---|---|---|---|---|---|---|
|  |  | Incident Surface | Exiting Surface |  | Incident Surface | Exiting Surface |
|  | R (=1/C1) | 1.844E+02 | 2.423E+02 | C2 | −8.113E−02 | −1.116E−01 |
| Light Source Part | A1 | −6.067E−06 | −7.835E−06 | B1 | 2.923E−03 | 8.675E−04 |
|  | A2 | 5.913E−03 | 1.979E−03 | B2 | −1.542E−03 | −6.622E−04 |
|  | A3 | −9.687E−06 | −8.632E−06 | B3 | −3.714E−05 | −1.208E−05 |
|  | A4 | −1.615E−05 | −1.132E−05 | B4 | 3.958E−06 | 2.710E−06 |
|  | A5 | 5.135E−07 | 3.483E−07 | B5 | −3.638E−08 | −1.092E−07 |
|  | A6 | −4.134E−09 | −5.200E−09 | B6 | −1.285E−09 | 1.568E−09 |
|  | A7 | −5.610E−11 | 2.807E−11 | B7 | 4.070E−12 | 1.274E−11 |
|  | A8 | 6.753E−13 | 7.265E−13 | B8 | 3.816E−13 | −3.567E−13 |
|  | A9 | 8.933E−15 | −1.859E−14 | B9 | 2.220E−15 | −7.030E−15 |
|  | A10 | −1.143E−16 | 1.288E−16 | B10 | −7.839E−17 | 1.415E−16 |
| Non-Light Source Part | A1 | 6.067E−06 | 7.835E−06 | B1 | −2.923E−03 | −8.675E−04 |
|  | A2 | 5.913E−03 | 1.979E−03 | B2 | −1.542E−03 | −6.622E−04 |
|  | A3 | 9.687E−06 | 8.632E−06 | B3 | −8.488E−05 | −2.688E−05 |
|  | A4 | −1.715E−05 | −1.168E−05 | B4 | 8.743E−06 | 4.263E−06 |
|  | A5 | 5.020E−07 | 3.129E−07 | B5 | −1.719E−07 | −1.948E−07 |
|  | A6 | −2.699E−09 | −3.300E−09 | B6 | −8.223E−10 | 4.467E−09 |
|  | A7 | −7.748E−11 | −1.842E−12 | B7 | 2.105E−11 | −3.627E−11 |
|  | A8 | 4.955E−13 | 4.103E−13 | B8 | 7.363E−13 | −2.590E−13 |
|  | A9 | 1.533E−14 | −1.216E−15 | B9 | −7.898E−15 | −9.235E−16 |
|  | A10 | −1.588E−16 | −4.861E−17 | B10 | −3.783E−17 | 1.035E−16 |

In Table 2, the aspherical coefficients are divided into those of a light source part close to the light source 110 and a non-light-source part far from the light source 110 with respect to a central axis of the scanning lens 160. That is, referring to FIG. 1, with respect to the main scanning section, a part of the beam L scanned on the scanned surface 201, which is close to the light source 110 (i.e., an upper part of the beam L) corresponds to the light source part, and a part of the beam L far from the light source 110 (i.e., a lower part of the beam L) corresponds to the non-light source part. From among the aspherical coefficients of Expression 7, those not shown in Table 2 are regarded as zero (0).

Referring to Tables 1 and 2, the design example of the light scanning unit 100 according to an embodiment is configured in such a way that the maximum scanning image height $Y_{max}$ is 108 mm, that the maximum main scanning incident angle $\Phi_{max}$ is 34.1°, and that an optical path of a scanning part of the light scanning unit 100 is shortened to 134 mm to achieve an image forming apparatus with a small size.

As shown in the design example of the light scanning unit 100, if the fθ coefficient of the imaging optical system is k and the valid scanning width is W, the condition of k/W=0.55<0.6 may be satisfied and thus the light scanning unit 100 may be configured to have a large viewing angle.

Also, as shown in the design example of the light scanning unit 100, if the valid scanning width is W and the distance from the reflective surface 151 to the scanned surface 201 is L, the condition of L/W=0.62<0.8 may be satisfied and thus an image forming apparatus employing the light scanning unit 100 may have a small size.

Interference between a screen angle and a profile of the beam L exposed on the scanned surface 201 of the photosensitive drum 200 according to the main scanning/sub-scanning incident angle will now be described.

Figure 7:
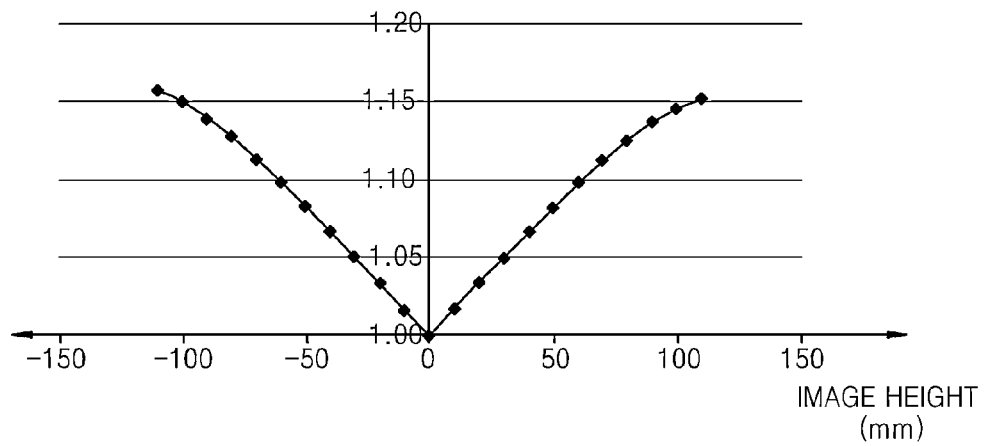
FIGS. 7 and 8 are graphs showing an asymmetry ratio of a beam spot with respect to image heights in cases when a sub-scanning incident angle is set as 12.6° and 5°.
Figure 8:
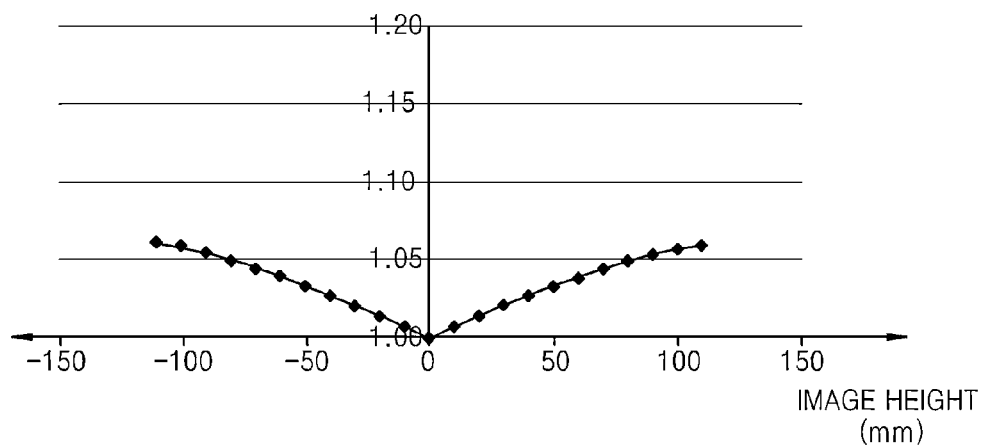

FIGS. 7 and 8 are graphs showing the asymmetry ratio $D_1/D_2$ of the beam spot BS with respect to image heights in cases when the sub-scanning incident angle β of the beam L incident on the scanned surface 201 of the photosensitive drum 200 in the light scanning unit 100 according to an embodiment is set as 12.6° and 5°. If the sub-scanning incident angle β is 12.6°, the asymmetry ratio $D_1/D_2$ reaches up to 15% at left and right sides of an image. On the other hand, if the sub-scanning incident angle β is 5°, the asymmetry ratio $D_1/D_2$ is not greater than 10% at left and right sides of an image.

Since the maximum main scanning incident angle $\Phi_{max}$ is 34.1° in an design example, if the sub-scanning incident angle β is 5°, the condition of $\Phi_{max} \cdot \beta = 170.5 < 180$ (i.e., Expression 6) is satisfied. That is, FIGS. 7 and 8 show that, if the light scanning unit 100 satisfies the condition of Expression 6, the asymmetry ratio $D_1/D_2$ of the beam spot BS may be suppressed to be less than 10%.

Figure 9:
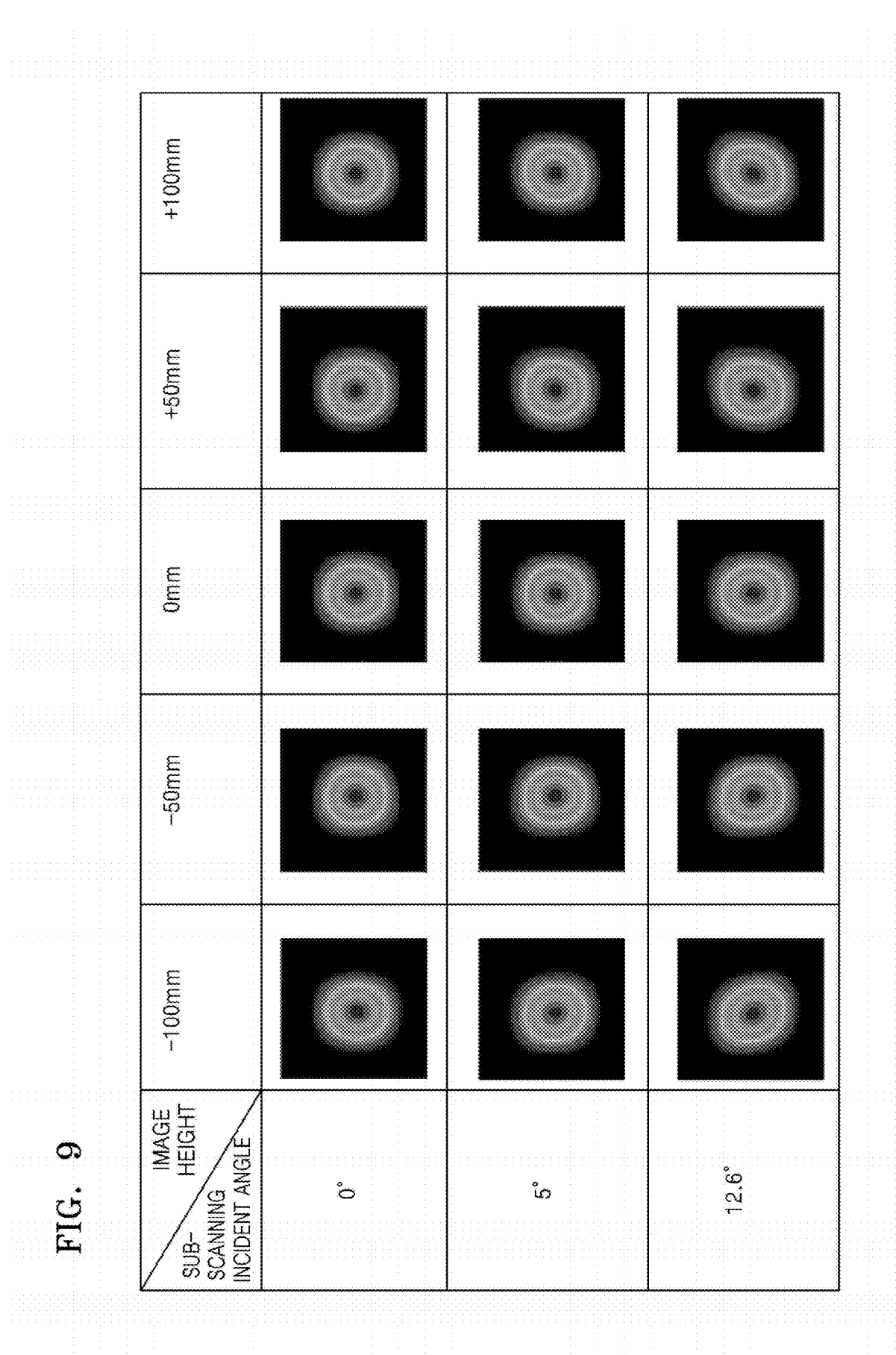
FIG. 9 is a table showing profiles of an exposed beam in cases when the sub-scanning incident angle is set as 0°, 5°, and 12.6°.

FIG. 9 is a table showing intensity profiles of a point spread function (PSF) on the photosensitive drum 200 in cases when the sub-scanning incident angle β of the beam L incident on the scanned surface 201 of the photosensitive drum 200 in the light scanning unit 100 according to an embodiment is set as 0°, 5°, and 12.6°. Referring to FIG. 9, if the sub-scanning incident angle β is 0°, as shown in Expression 3, asymmetry of the beam spot BS does not occur. If the sub-scanning incident angle β is 5°, asymmetry of the beam spot BS very slightly occurs and thus may be ignored. However, if the sub-scanning incident angle β is 12.6°, asymmetry of the beam spot BS greatly occurs. That is, FIG. 9 shows that the beam L having a circular cross-section is also distorted as in the one having a rectangular cross-section.

The light scanning unit 100 according to an embodiment suppresses an asymmetry ratio of the beam spot BS of the beam L exposed on the scanned surface 201, to be less than 10% by satisfying a predetermined condition as described above. The suppression of the asymmetry ratio of the beam spot BS may be a critical factor for improving image quality when a new color is obtained by overlapping toners of different colors.

In a color image forming apparatus, when a color image is formed by overlapping single-color images on a recording medium, since locations where the images are recorded are inevitably slightly offset from each other, a stain or a moire pattern is generated due to inappropriately mixed colors. In order to prevent this problem, a color image forming apparatus may set different screen angles to different color images. As such, even when locations of the color images are offset, colors may be constantly maintained and a moire pattern may be prevented. For example, an image forming apparatus employing the light scanning unit 100 according to an embodiment may employ a combination of screen angles that are broadly and generally used in print apparatuses, i.e., yellow 0°, cyan or magenta 75°, and black 45°, and magenta or cyan 105°.

Figure 10:
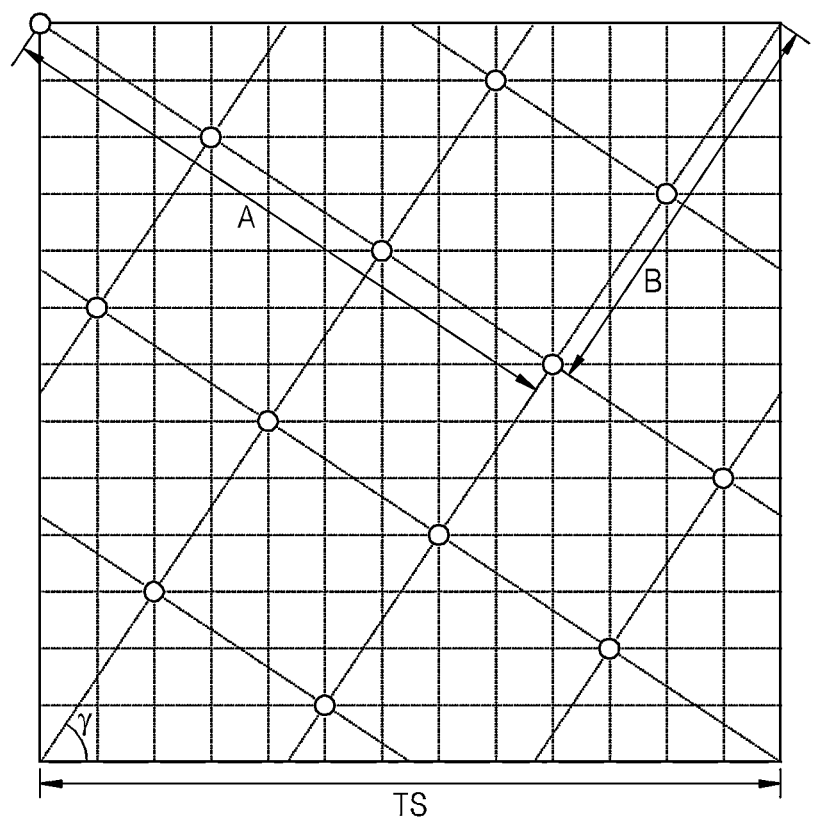
FIG. 10 is a diagram for describing a screen angle.

FIG. 10 is a diagram for describing a screen angle. Referring to FIG. 10, each square may be understood as one beam spot BS of a beam L (i.e., a dot). A gray scale of an image is represented as a set of beam spots BS of the beam L (i.e., dots). In a color image forming apparatus, in order to suppress generation of a stain or a moire pattern, a screen represented as a set of dots in a predetermined unit represents gray scales of different color images with different patterns (i.e., different screen angles). FIG. 10 may be understood as one cycle TS of a screen, and a ratio γ of A and B that are units of a set of dots is a screen angle.

Figure 11A:
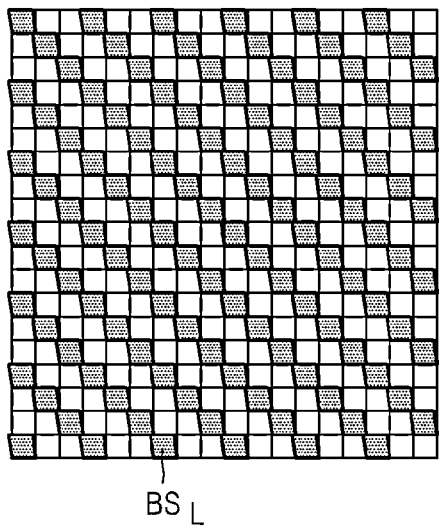
FIGS. 11A and 11B are diagrams showing interference due to asymmetry of an exposed beam when a screen angle is 135°.
Figure 11B:
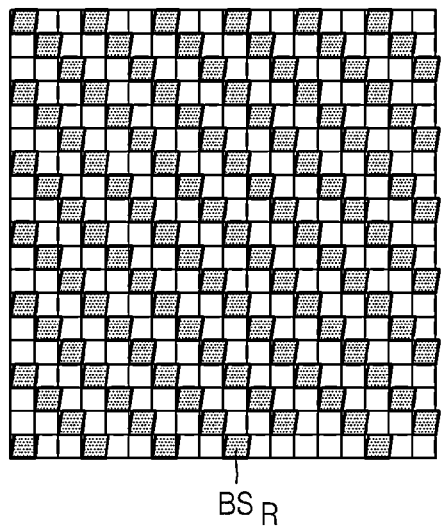
Figure 12A:
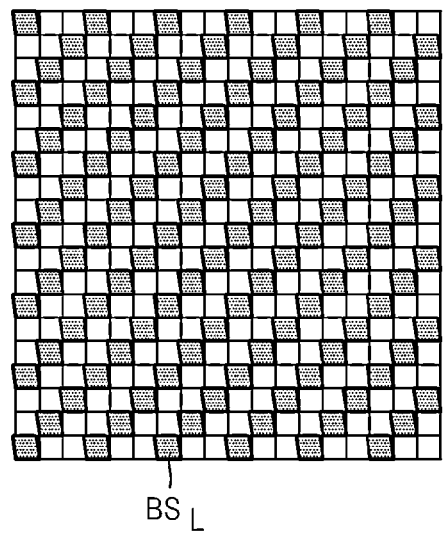
FIGS. 12A and 12B are diagrams showing interference due to asymmetry of the exposed beam when the screen angle is 45°.
Figure 12B:
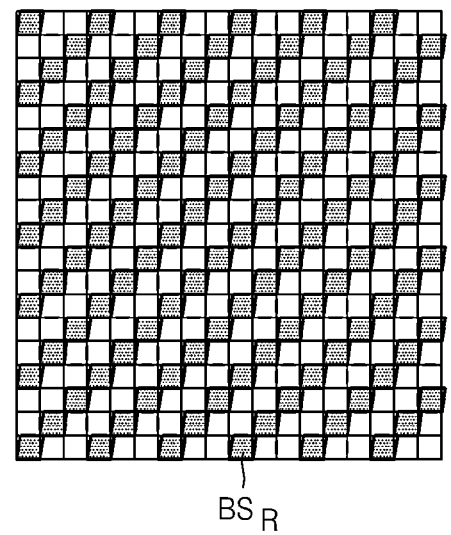

FIGS. 11A and 11B are diagrams showing interference due to asymmetry of an exposed beam when a screen angle is 135° in a conventional light scanning unit. FIGS. 12A and 12B are diagrams showing interference due to asymmetry of the exposed beam when the screen angle is 45° in the conventional light scanning unit.

FIGS. 11A and 11B, and 12A and 12B show interference when an asymmetry ratio of beam spots is equal to or greater than 10% in the conventional light scanning unit. Referring to FIGS. 11A and 11B, and 12A and 12B, since overlapping amounts according to the direction of the screen angle due to adjacent dots are not uniform at left and right sides of an image, the amounts of toners developed on the photosensitive drum 200 are different. Such interference causes a difference in color densities between left and right sides of each color image according to the screen angle, and reduces image quality of the conventional color image forming apparatus. Also, such interference greatly occurs in a high resolution mode (a large number of lines per inch (LPI)) when the distance between adjacent dots is small.

However, in the light scanning unit 100 according to an embodiment, if the sub-scanning incident angle β of the beam L incident on the scanned surface 201 of the photosensitive drum 200 is set to be equal to or less than 5°, since an asymmetry ratio of a profile of the exposed beam L is suppressed to be equal to or less than 10%, interference between profiles and screen angles of adjacent dots may be reduced.

Although the imaging optical system includes one scanning lens 160 in the above description, the imaging optical system is not limited thereto. The imaging optical system is a system for imaging the beam L deflected and scanned by the optical deflector 150 on the scanned surface 201, and may include at least one aspherical lens having fθ characteristics for allowing the beam L to be scanned onto the scanned surface 201 at a constant speed. That is, the imaging optical system may include two or more aspherical scanning lenses.

An example of an electro-photographic image forming apparatus employing the above-described light scanning unit 100 will now be described with reference to FIG. 13.

Figure 13:
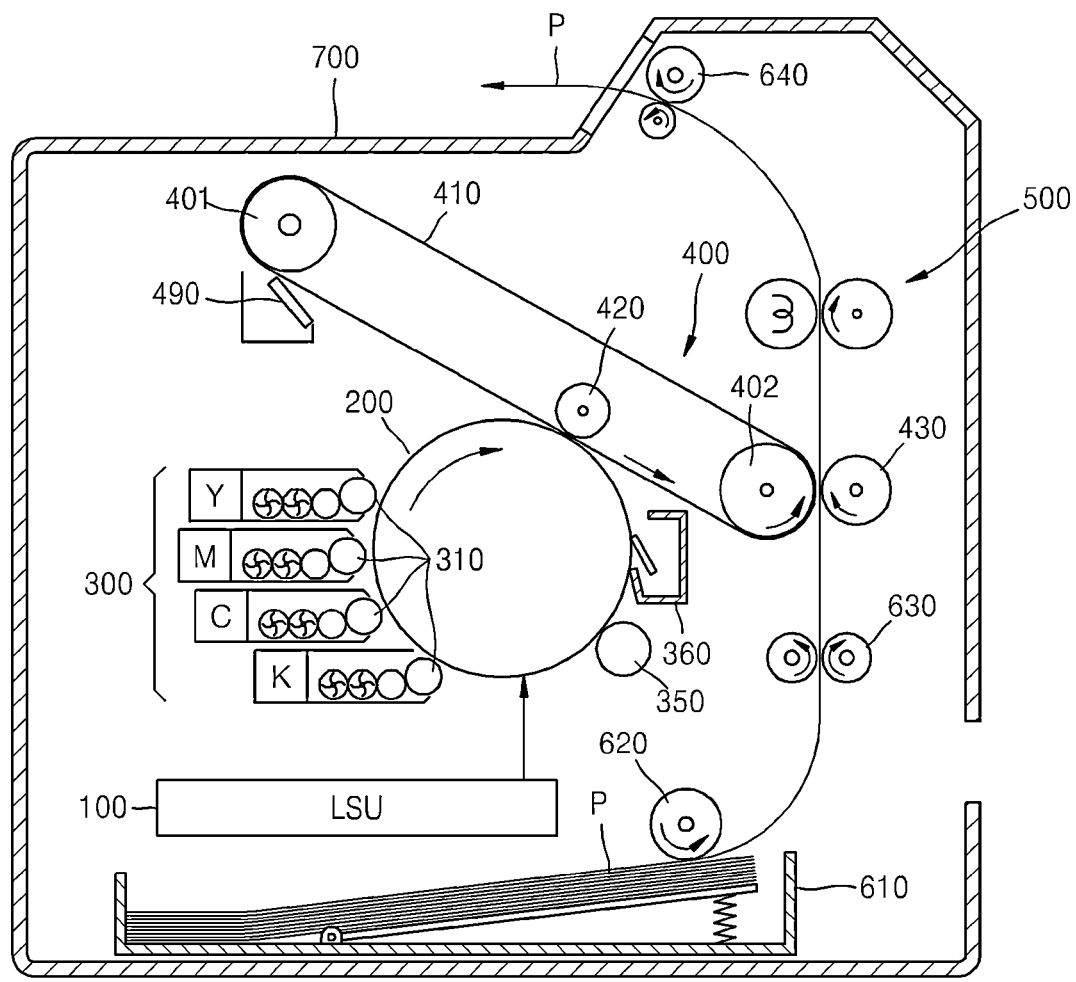
FIG. 13 is a schematic diagram showing a configuration of an image forming apparatus according to an embodiment.

FIG. 13 is a schematic diagram showing a configuration of an image forming apparatus according to an embodiment. Referring to FIG. 13, the image forming apparatus according to an embodiment is a multi-path type color image forming apparatus. In FIG. 13, the image forming apparatus includes an image forming unit for electro-photographically forming a toner image, a transferring unit 400 for transferring the toner image via an intermediate transferring member 410 to a recording medium P, and a fixing unit 500 for fixing the toner image on the recording medium P by applying, for example, heat and pressure to the toner image.

The image forming unit may include the photosensitive drum 200, an electrifier 350, the light scanning unit 100, and a developer 300. The photosensitive drum 200 is an example of an image carrier on which an electrostatic latent image is to be formed. The photosensitive drum 200 may include, for example, a cylindrical core having conductivity and a photosensitive layer formed on an outer circumference of the cylindrical core. The electrifier 350 electrifies an outer circumferential surface of the photosensitive drum 200 to a uniform potential. As the electrifier 350, for example, an electrification roller that rotates while contacting or not contacting the photosensitive drum 200 and supplies charges to the outer circumferential surface of the photosensitive drum 200 may be employed. Also, as the electrifier 350, a corona discharger (not shown) may be employed. The light scanning unit 100 is formed as described above to satisfy a predetermined condition in order to suppress an asymmetry ratio of a beam spot. The light scanning unit 100 forms an electrostatic latent image by scanning light corresponding to image information onto the photosensitive drum 200 that is electrified to have a uniform potential.

The image forming unit according to an embodiment includes four developers 300Y, 300M, 300C, and 300K respectively accommodating yellow (Y), magenta (M), cyan (C), and black (K) developing agents for printing a color image. The developing agents for printing a color image are not limited to the above four colors. A white developer or intermediate color developers may be further used and, in this case, the number of developers may be increased. If a one-component developing method is employed, a developing agent refers to a toner. If a two-component developing method is employed, a developing agent includes a carrier and a toner. The two-component developing method refers to a developing method for forming a developing agent layer from a carrier and a toner on an outer circumference of a developing roller to be described below, and developing only the toner of the developing agent layer onto a photoconductor. Alternatively, various developing methods, e.g., a hybrid developing method using a one-component and a two-component developing method, may be employed. Hereinafter, for convenience's sake, a developing agent is referred to as a toner. Also, if there is a need to identify components according to colors, the components are identified by adding Y, M, C, and K to their reference numerals.

The four developers 300Y, 300M, 300C, and 300K respectively supply Y, M, C, and K toners to and develop the electrostatic latent image formed on the photosensitive drum 200. Each of the developers 300Y, 300M, 300C, and 300K includes a developing roller 310. Each of the developers 300Y, 300M, 300C, and 300K is located in such a way that the developing roller 310 is spaced apart from the photosensitive drum 200 by a developing gap. The developing gap may be about several ten to several hundred microns. Although not shown in FIG. 13, each of the developers 300Y, 300M, 300C, and 300K may include an agitator for agitating a toner accommodated therein, a supply roller for supplying the toner to the developing roller 310, and a restriction member for restricting a thickness of a toner layer formed on an outer circumference of the developing roller 310.

In a multi-path type color image forming apparatus, the developers 300Y, 300M, 300C, and 300K are disposed around an outer circumferential surface of one photosensitive drum 200, and sequentially operate. A developing bias may be applied to the developing roller 310 of a selected developer (e.g., 300Y) and the developing bias may not be applied, or a developing prevention bias may be applied to the developing rollers 310 of the other developers (e.g., 300M, 300C, and 300K). Also, only the developing roller 310 of a selected developer (e.g., 300Y) may rotate and the developing rollers 310 of the other developers (e.g., 300M, 300C, and 300K) may not rotate.

The intermediate transferring member 410 may be formed as a belt supported by, for example, supporting rollers 401 and 402 and driven at a linear velocity equal to the linear velocity of the photosensitive drum 200. The intermediate transferring member 410 may have a length equal to or greater than the length of a maximum size recording medium P used in the image forming apparatus. A first transferring roller 420 faces the photosensitive drum 200 with respect to the intermediate transferring member 410, and a first transferring bias for transferring a toner image developed on the photosensitive drum 200 to the intermediate transferring member 410 is applied to the first transferring roller 420. A second transferring roller 430 is disposed to face the intermediate transferring member 410. The second transferring roller 430 may be spaced apart from the intermediate transferring member 410 while the toner image is being transferred from the photosensitive drum 200 to the intermediate transferring member 410, and may contact the intermediate transferring member 410 at a predetermined pressure after the toner image is completely transferred to the intermediate transferring member 410. A second transferring bias for transferring the toner image to the recording medium P is applied to the second transferring roller 430. A cleaning unit 360 removes the toner that remains on the photosensitive drum 200 after the toner image is transferred. A corona transcriber may be employed instead of the first and second transferring rollers 420 and 4430.

A process of forming a color image by using the above-described configuration will now be described in brief.

A surface of the photosensitive drum 200 is electrified to a uniform potential by the electrifier 350, and the light scanning unit 100 emits light modulated to correspond to, for example, Y image information to the photosensitive drum 200 and thus forms a Y electrostatic latent image on the surface of the photosensitive drum 200. If the developing roller 310 of the developer 300Y rotates and a developing bias is applied thereto, the Y toner image is formed. The Y toner image is transferred to the intermediate transferring member 410 due to a first transferring bias applied by the first transferring roller 420.

Then, if M, C, and K toner images are sequentially transferred from the photosensitive drum 200 to the intermediate transferring member 410, a color toner image is formed on a surface of the intermediate transferring member 410. As described above, in an image exposed and formed by the light scanning unit 100, screen angles may be differently set to Y, M, C, and K images. The recording medium P taken by a pickup roller 620 out of a feeding cassette 610 is transferred by feeding rollers 630 to a transferring region where the intermediate transferring member 410 and the second transferring roller 430 face each other. In the transferring region, the color toner image is transferred to the recording medium P. A cleaning member 490 may be disposed on an upper stream side of an intermediate transfer region where the photosensitive drum 110 and the first transfer roller 420 face each other so that the toner remaining on the intermediate transfer member 210 is removed after transferring the image to the recording medium P in the transfer region. If the recording medium P passes through the fixing unit 500, the color toner image is fixed onto the recording medium P due to heat and pressure. The completely fixed recording medium P is discharged by discharging rollers 640 to a discharging tray 700.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A light scanning unit for scanning a beam onto a scanned surface, the light scanning unit comprising:
    a light source which emits a beam according to an image signal;
    an optical deflector which deflects and scans the beam emitted from the light source, in a main scanning direction; and
    a imaging optical system which images the beam deflected and scanned by the optical deflector, on the scanned surface,
    wherein, if a main scanning direction width of the beam emitted from the light source is defined as a, a sub-scanning direction width of the beam is defined as b, a main scanning incident angle of the beam incident on the scanned surface with respect to a main scanning section is defined as $\Phi$, and a sub-scanning incident angle of the beam incident on the scanned surface with respect to a sub-scanning section is defined as $\beta$, a maximum main scanning incident angle $\Phi_{max}$ and a sub-scanning incident angle $\beta$ of the beam satisfy the following expression:
    <Expression>
    $\Phi_{max} \cdot \beta < 0.1 \times b/2a.$ 2. The light scanning unit of claim 1, wherein the maximum main scanning incident angle $\Phi_{max}$ and the sub-scanning incident angle $\beta$ of the beam satisfy the following expression:
    <Expression>
    $\Phi_{max} \cdot \beta < 180.$ 3. The light scanning unit of claim 2, wherein the maximum main scanning incident angle $\Phi_{max}$ is greater than 30° and the sub-scanning incident angle $\beta$ is equal to or less than 5°.

4. The light scanning unit of claim 1, wherein, if an f$\theta$ coefficient of the imaging optical system is defined as k, and a valid scanning width of the beam scanned onto the scanned surface is defined as W, the f$\theta$ coefficient k and the valid scanning width W satisfy the following expression:
    <Expression>
    $k/W < 0.6.$ 5. The light scanning unit of claim 1, wherein, if a valid scanning width of the beam scanned onto the scanned surface is defined as W, and a scanning distance from the optical deflector to the scanned surface is defined as D, the valid scanning width W and the scanning distance D satisfy the following expression:
    <Expression>
    $D/W < 0.6.$ 6. The light scanning unit of claim 5, wherein the scanning distance D from the optical deflector to the scanned surface is equal to or less than 140 mm.

7. The light scanning unit of claim 6, wherein the imaging optical system comprises at least one scanning lens having f$\theta$ characteristics.

8. An electro-photographic image forming apparatus comprising:
an image carrier;
a light scanner which forms an electrostatic latent image by scanning light onto a scanned surface of the image carrier; and
a developer which supplies a toner and develops the electrostatic latent image formed on the image carrier,
wherein the light scanner comprises:
a light source which emits a beam according to an image signal;
an optical deflector which deflects and scans the beam emitted from the light source, in a main scanning direction; and
a imaging optical system which images the beam deflected and scanned by the optical deflector, on the scanned surface, and
wherein, if a main scanning direction width of the beam emitted from the light source is defined as a, a sub-scanning direction width of the beam is defined as b, a main scanning incident angle of the beam incident on the scanned surface with respect to a main scanning section is defined as $\Phi$, and a sub-scanning incident angle of the beam incident on the scanned surface with respect to a sub-scanning section is defined as $\beta$, a maximum main scanning incident angle $\Phi_{max}$ and a sub-scanning incident angle $\beta$ of the beam satisfy the following expression:
<Expression>

$$\Phi_{max} \cdot \beta < 0.1 \times b/2a.$$

9. The electro-photographic image forming apparatus of claim 8, wherein the maximum main scanning incident angle $\Phi_{max}$ and the sub-scanning incident angle $\beta$ of the beam satisfy the following expression:
<Expression>

$$\Phi_{max} \cdot \beta < 180.$$

10. The electro-photographic image forming apparatus of claim 9, wherein the maximum main scanning incident angle $\Phi_{max}$ is greater than 30° and the sub-scanning incident angle $\beta$ is equal to or less than 5°.

11. The electro-photographic image forming apparatus of claim 8, wherein, if an f$\theta$ coefficient of the imaging optical system is defined as k, and a valid scanning width of the beam scanned onto the scanned surface is defined as W, the f$\theta$ coefficient k and the valid scanning width W satisfy the following expression:
<Expression>

$$k/W < 0.6.$$

12. The electro-photographic image forming apparatus of claim 8, wherein, if a valid scanning width of the beam scanned onto the scanned surface is defined as W, and a scanning distance from the optical deflector to the scanned surface is defined as D, the valid scanning width W and the scanning distance D satisfy the following expression:
<Expression>

$$D/W < 0.6.$$

13. The electro-photographic image forming apparatus of claim 12, wherein the scanning distance D from the optical deflector to the scanned surface is equal to or less than 140 mm.

14. The electro-photographic image forming apparatus of claim 13, wherein the imaging optical system comprises at least one scanning lens having f$\theta$ characteristics.

15. The electro-photographic image forming apparatus of claim 8, wherein the image carrier is a photosensitive drum.

16. The electro-photographic image forming apparatus of claim 8, wherein a plurality of developers are disposed around one image carrier.

* * * * *